United States Patent
Ferreyra et al.

(10) Patent No.: US 11,262,888 B1
(45) Date of Patent: Mar. 1, 2022

(54) CONSISTENT CONTEXT-DEPENDENT RENDERING OF USER INTERFACE DATA

(71) Applicant: Amazon Technologies, Inc., Seattle, WA (US)

(72) Inventors: Alexis Ferreyra, Vancouver (CA); Stuart Olmstead-Wilcox, Richmond (CA); Amit Malhotra, West Vancouver (CA); Javier Andres Mena Zapata, Vancouver (CA); John William Buchanan, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/879,677

(22) Filed: May 20, 2020

(51) Int. Cl.
  *G06F 3/0482* (2013.01)
  *G06F 3/0484* (2013.01)
  *G06F 9/451* (2018.01)
  *G06F 3/04845* (2022.01)

(52) U.S. Cl.
  CPC ........ *G06F 3/0482* (2013.01); *G06F 3/04845* (2013.01); *G06F 9/451* (2018.02)

(58) Field of Classification Search
  CPC ..... G06F 3/0482; G06F 3/04845; G06F 9/451
  See application file for complete search history.

(56) References Cited

U.S. PATENT DOCUMENTS

| | | | | |
|---|---|---|---|---|
| 10,185,709 | B1* | 1/2019 | MacTaggart | G06F 40/58 |
| 2015/0242457 | A1* | 8/2015 | Collier | G06F 40/186 707/701 |
| 2016/0124918 | A1* | 5/2016 | Ying | G06F 16/9535 715/234 |
| 2017/0104842 | A1* | 4/2017 | Busayarat | H04L 43/045 |
| 2019/0332709 | A1* | 10/2019 | Peng | G06F 40/14 |
| 2020/0097161 | A1* | 3/2020 | Gonzalez | G06F 3/0482 |
| 2020/0410049 | A1* | 12/2020 | Tripathi | H04L 67/306 |

* cited by examiner

*Primary Examiner* — John T Repsher, III
(74) *Attorney, Agent, or Firm* — Knobbe, Martens, Olson & Bear, LLP

(57) ABSTRACT

Systems and methods are provided for rendering content for presentation in a portion of a user interface based on context-independent data and a template that is selected based on context information associated with the user interface. The template may be selected from among a number of different templates based at least in part on a template selection data structure that associates each template with one or more combinations of contextual attributes associated with the context of the user interface. The content for inclusion in at least a portion of the user interface may then be rendered using the selected template and at least a portion of the context-independent data.

19 Claims, 7 Drawing Sheets

CONSISTENT CONTEXT-DEPENDENT RENDERING OF USER INTERFACE DATA

BACKGROUND

For a large individual website or other large host of network-accessible content, there may be a huge variety of user interface configurations or page configurations that may be presented to users depending on various contextual factors. For example, page content for a given page request from a client device may be dynamically assembled by a server to include content from a variety of sources based on certain base content that the user is requesting to view, as well as additional information that may be relevant to the user or customized to the user. For example, if a user is requesting to view information about an item for potential purchase, the responsive page generated for display may include not only information about the item itself, but also personalized recommendations of other items that may be of interest to the user, estimated delivery time for that particular item to be delivered to the particular user, etc.

In existing websites, it is common for variations in the manner in which particular content is displayed in different contexts or on different types of user interfaces to be accomplished via inefficient code that may not be centrally managed. For example, item delivery estimate information may be presented in different portions of various webpages and application user interfaces (which may be optimized for mobile display device, desktop computer display, etc.) in different contexts (including a page that first displays item information to a user, a page presented after the user adds an item to an electronic shopping cart, etc.). The content rendering logic and instructions for each of these contexts may reside in different network locations and may be separately maintained by development teams, which may lead to scalability problems and inconsistent viewing experiences across different contexts.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1:
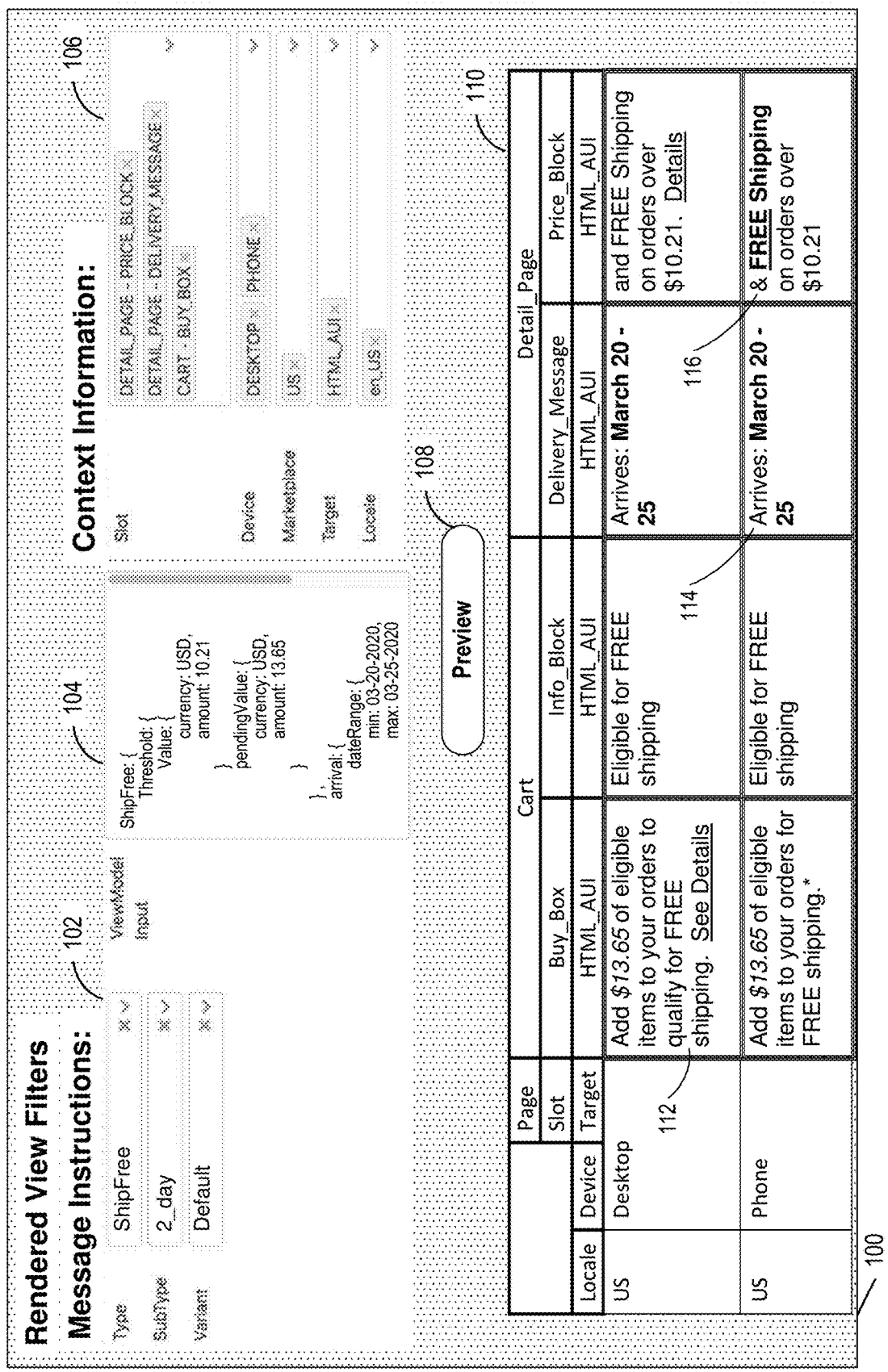
FIG. 1 depicts an example user interface that may be presented to a developer or similar user in order to manage and browse message instruction data and preview associated view fragments that may be presented in different contexts.

For reasons described above, many large websites and other network-accessible content providers do not currently implement any centralized, federated architecture to present content or messaging across their pages or other user interfaces in an accurate, consistent and low-latency fashion. Thus, there is a need in many existing systems for a centralized platform which allows developers and others within a company operating a website or other software services (such as product managers or other owners of features implemented via pages and other user interfaces associated with the company's services) to establish and manage the end-to-end user experience associated with individual messages or content features, including both the final content rendering and underlying business logic across different contexts and display endpoints. Such a platform is described herein, and provides significant technical improvements relative to existing systems, such as existing systems in which implementing a feature change or addition may require piecemeal development across a number of different page stacks, geographies (e.g., display in different countries), display devices (e.g., mobile devices versus desktop computers), display applications (e.g., a web browser versus a dedicated application), etc.

The platform or framework described herein may, in some embodiments, implement a centralized, decoupled architecture that enables accelerated innovation by developers and feature designers. Aspects of the present disclosure enable development teams to independently own and iterate on both business logic and customer experience aspects related to their user-facing features in a manner that results in users across a number of different pages or user interfaces being presented the feature content or messaging in a consistent, accurate and timely manner. This may be accomplished in part, in some embodiments, by enabling development teams to deploy their own business logic via a centralized-yet-federated architecture that does not require making piecemeal changes in every single page stack (e.g., different pages and contexts in which similar messaging or content may appear). Furthermore, the consistent display of messaging may occur at the sub-page level, in the sense that a portion or fragment of a page or other user interface to be presented to a user may be generated based on templates that will be described herein, rather than the templates being applied at the level of a full page or complete user interface.

As will be discussed, the platform may include one system or sub-system (often referred to herein as a message instruction provider system) that is responsible for generating message instructions that employ business logic without implementing any view or rendering logic, while another system or sub-system (often referred to herein as a message instruction rendering system) receives those message instructions and employs view layer instructions without implementing any business logic. In some embodiments, the system provides for distributed ownership of both templates and message instructions to allow each owner (which may be a team or individual responsible for a given message feature or type of message, for instance, and may be considered a tenant of the system in some embodiments) to evolve their logic and user experience details independently. These benefits of aspects described herein are particularly valuable in a large, decentralized company where multiple disparate stakeholders desire to evolve their customer experiences and features independently of each other.

Aspects of the present disclosure, according to some embodiments, include a content rendering system (often referred to herein as a message instruction rendering system) that is configured to receive both a view-independent message instruction object and separate context information related to a current viewing environment, and to generate a view fragment or portion of a user interface to be displayed in the current viewing environment. The viewing environment or display endpoint (which may have associated context information that is provided to the content rendering system) may be a particular page or user interface to be presented on a particular device type, in a particular geographic region, within a particular marketplace, and/or associated with one or more other contextual attributes. The view fragment rendered by the content rendering system described herein may display messaging, information or other content that is included in the view-independent message instruction object, but that is tailored for display in the given context based on a template that is selected specifically for the given context from among a potentially large number of potential templates that are each compatible with the same message instruction object (but that are intended for use with different combinations of contextual attributes associated with the viewing environment or display endpoint).

In some embodiments, as will be discussed herein, the template employed in a given rendering instance may be dynamically selected by the content rendering system based on a tree structure or graph (or similar logic or structure) that is traversed based on the context information. For example, different levels of a tree data structure may be associated with different types of contextual attributes (e.g., page type, position or slot within the page, device type, geographic location, language, etc.), where the node followed at a given level of the tree is determined based on the contextual attribute value of the corresponding contextual attribute for the current viewing context.

As one specific example that will be further described with respect to FIGS. 1 and 2 below, delivery-related messages such as the estimated delivery time for delivering a product to a customer may be included for display across a large number of different webpages or other user interfaces that appear in different contexts, such as an item detail page that initially shows product information to a user or a shopping cart page presented after the item is in a user's electronic shopping cart. Each of these example types of user interfaces (and many others) may be rendered for display differently when viewed on a mobile phone versus a desktop computer, and may be rendered differently based on additional context information such as whether viewed in the U.S. or another country. As the different potential combinations of contextual attributes grows, there is more and more technical benefit to the aspects of the present disclosure that enable separating view-independent data (such as an indication that delivery of a product is expected in a certain time range) from view-dependent templates that reference such data and indicate how to display it in a given context. There are additional benefits (e.g., in terms of efficiency, ease of propagating changes, and consistency in rendering) to separating both this view-independent data and the templates from underlying code defining a given page as a whole. This allows developers to avoid repeating code across different pages (which may then each need to be edited later on to maintain consistency across pages), among other benefits described herein.

In some embodiments, the content to be presented on a client computing device according to methods described herein may be in the form a graphical user interface, which may be visually presented via a browser or other application operating on the client computing device. In other embodiments, the content to be presented on a client computing device may be audio content to be audibly presented, either with or without accompanying visual content. For example, the client computing device may be a smart speaker or similar device that may not be configured to display any visual user interface, but instead implements user interface features via audible presentation by the device and spoken commands by a user. Accordingly, references to a "user interface" herein do not necessarily refer to a graphical or visual interface, but may, depending on context, encompass an audio-based user interface in which interaction between a computing device and a user of the computing device occurs via audible content rather than (or in addition to) via visual content.

In some embodiments, audio presentation data may include a computer-generated audio file of speech content. The generated content may also include one or more supporting data files. In some embodiments, an audio file or associated data sent to a smart speaker or other client computing device may be sent in phases. For example, a text-based file may be initially sent, such as an Extensible Markup Language (XML) document or JavaScript Object Notation (JSON) file that includes metadata or instructions related to the audio to be presented, and that also identifies one or more uniform resource identifiers (URIs) for media content (such as audio content generated for audible presentation). The client computing device may then parse the initial file to determine which additional URIs to request over the network for audible presentation. In other embodiments, content to be audibly presented may be generated as text content and sent to the client computing device, where the client computing device may then generate automated speech content for audible presentation using text-to-speech functionality.

FIG. 1 depicts an example graphical user interface 100 that may be presented to a developer or similar user in order to manage and browse message instruction data and preview associated view fragments that may be presented in different contexts. The user interface 100 may be presented, for example, to a member of a development team or business person (such as a product manager) responsible for managing the messaging or other user-facing content for a certain feature of a website or application. In the illustrated example, the feature being managed may be product delivery information associated with any of a variety of products that a retail website or other retail operator may offer to customers.

Preview rendering section 110 of the user interface 100 depicts samples of how the same message instruction (for which information is shown in message instruction section 102) may be rendered for display in various contexts. The different appearances of the message content shown in preview rendering section 110 may be the result of different templates that are used in rendering the view based on different combinations of contextual attributes. Various members of a team responsible for implementing the product delivery features, in this example, may access a console or other user interface similar to user interface 100 in order to see the different contexts (and associated example renderings) in which messaging or other content related to the product delivery features may be displayed to customers or other users.

The contextual attribute combinations that lead to particular rendering previews are shown in the row and column labels of section 110. For example, when rendered using a first template, the given message instruction data in section 102 may have the appearance previewed in view fragment 112. When rendered using a second template, the same message instruction data in section 102 may have the different appearance that is previewed in view fragment 114. As indicated in the row and column labels of section 110, the first template (leading to view fragment 112) may be used when the contextual attributes include the following combination: a "Page" type contextual attribute with the value "Cart" (which may refer to a page that displays the contents of a user's electronic shopping cart), a page "Slot" type contextual attribute with the value "Buy_Box" (which may refer to a particular portion, row or section of the "Cart" page type), a "Locale" type contextual attribute with the value "US" (e.g., for viewing by a user in the United States), and a "Device" type contextual attribute with the value "desktop" (which may mean the view fragment 112 is for inclusion in a user interface intended for viewing on a desktop computer rather than a mobile phone or tablet). In contrast, the second template (leading to view fragment 114) may be used when the contextual attributes include the following combination: a "Page" type contextual attribute with the value "Detail_Page" (which may refer to a page that displays item details about an item available for purchase), a page "Slot" type contextual attribute with the value "Delivery_Message" (which may refer to a particular portion, row or section of the "Detail_Page" page type that displays messages related to estimated delivery time for an item), a "Locale" type contextual attribute with the value "US," and a "Device" type contextual attribute with the value "Phone" (which may mean the view fragment 114 is for inclusion in a user interface intended for viewing on a mobile phone).

User interface 100 includes a message instructions section 102 in which the user may select a particular message instruction (in this case, a message instruction having the type "ShipFree," the subtype "2_day," and the variant "Default"). The associated view model data for the given message instruction is partially shown in section 104. Message instruction data, including view model data, will be further described below. In short, in one embodiment, a message instruction object or data structure may include use case information (such as the type, subtype and variant, in the illustrated example) and view model data that indicates use case-specific metadata that may be represented in key-value pairs for later use in view rendering. User interface 100 further includes a context information portion 106 where the user may view and select among the particular contextual attribute values for various attribute types that are associated with contexts in which the given message instruction 102 may be rendered for display. It will be appreciated that many other combinations of context information may be selected in different instances and embodiments. For example, while context information 106 only includes a target content format of HTML, other target content formats could include XML, JSON, and/or proprietary formats for use with particular hardware, software or presentation types (e.g., audible presentation rather than visual presentation). User selection of the selectable option 108 ("Preview") may cause an updating of the preview rendering section 110 based on user changes in the context information section 106 or message instruction section 102. While the templates associated with particular contexts are not illustrated in FIG. 1, they will be described in more detail below with respect to other figures.

Figure 2:
FIG. 2 depicts an illustrative user interface presented on a mobile device, where a portion of the user interface may be rendered according to a context-specific template and view-independent message instruction data.

FIG. 2 depicts an illustrative graphical user interface 200 presented on a mobile device 202, where one or more individual portions of the user interface may be rendered according to a context-specific template and view-independent message instruction data. In the illustrated example, the mobile device 202 may be a mobile phone. The user of mobile computing device, prior to generation of the user interface 204, may have requested to view item information for a shirt item 206. The user interface 204 may be considered an item detail page for the shirt item 206, as referenced by the "Detail_Page" page type mentioned in FIG. 1 above. The user interface 204 may have been generated by a front-end interface system that will be described below, and delivered to the mobile device 202 over a network for display. Further details regarding the generation of a user interface such as user interface 204 will be further described below with respect to FIG. 4. It will be appreciated that in other embodiments, similar user interface data may be audibly presented by a client computing device rather than as a visual user interface, such as computer-generated speech that indicates that the item 206 arrives March 20-25 and ships for free on orders over $10.21, where the precise message wording may differ from that shown in graphical user interface 204 based on the different context information (and associated template) that may be associated with a device presenting audible content.

As illustrated, the content displayed in portions 210 and 212 of the user interface 204 may have been generated to include context-dependent view fragments that were generated as previewed in FIG. 1 discussed above. For example, the rendered message content in portion 210 (appearing as "Arrives March 20-25") may correspond to the preview view fragment 114 described above with respect to FIG. 1, while the rendered message content in portion 212 may correspond to the preview view fragment 116 shown in FIG. 1. Portions 210 and 212 may each have the rendered view appearance as shown in user interface 204 based on a combination of the underlying message instruction data and a template that was selected based on the context information. For example, the contextual attributes associated with user interface 204 that led to a particular template selection for rendering portions 210 and 212 may include that the user interface 204 has a page type of "Detail_Page," slot types of "Delivery_Message" and "Price_Block," a locale type of "US," and a device type of "Phone." The associated template selection process will be further described below.

Figure 3:
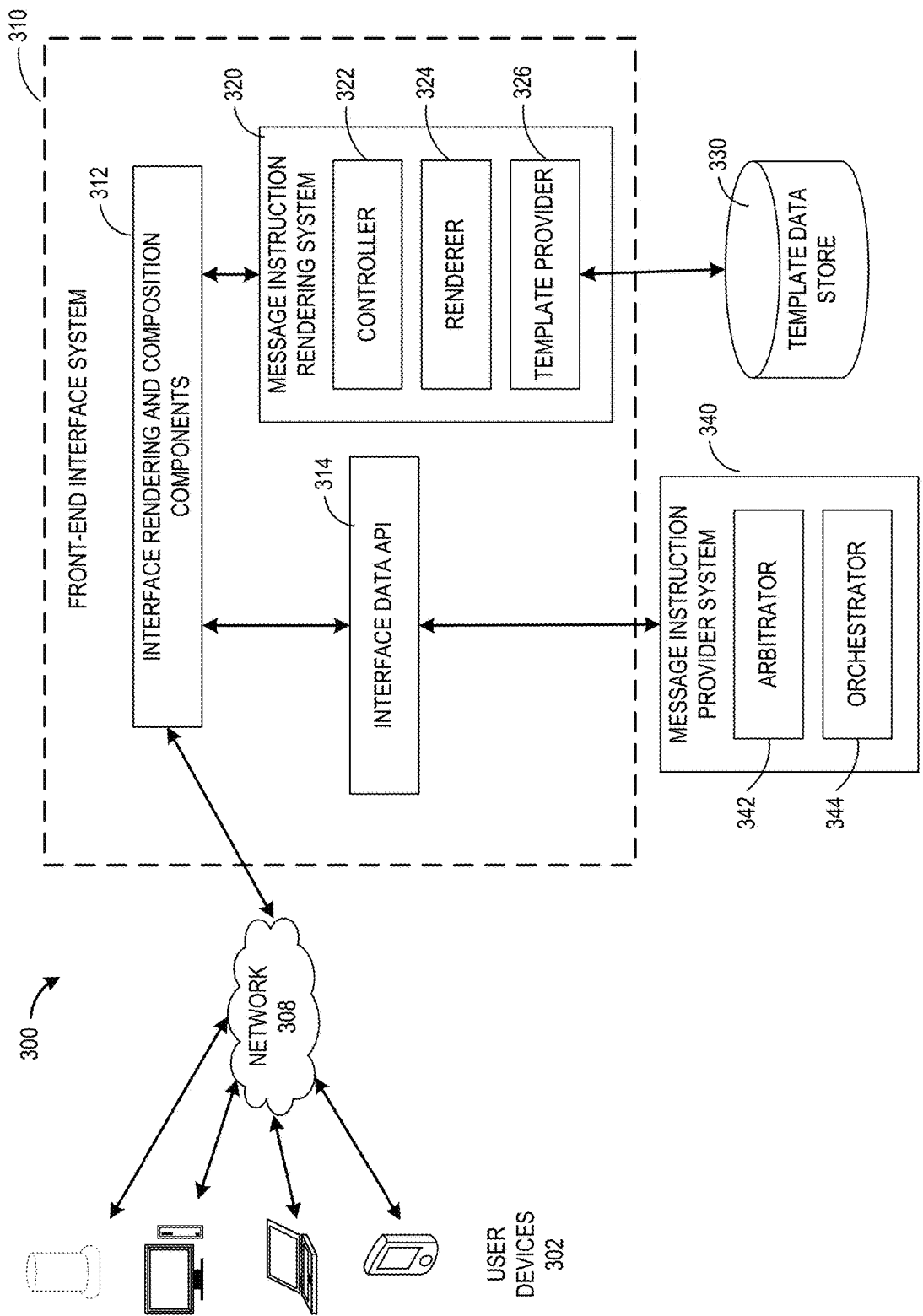
FIG. 3 is a block diagram depicting an illustrative operating environment for generating a user interface that includes a portion of the user interface that has been generated using a template that was selected based on contextual attributes associated with the user interface.

FIG. 3 is a block diagram depicting an illustrative operating environment 300 for generating a user interface that includes at least one context-dependent portion of the user interface. The illustrative operating environment shown in FIG. 3 includes a front-end interface system 310 that is in communication with user devices 302 and a message instruction provider system 340. In other embodiments, the functionality implemented by the front-end interface system and message instruction provider system may be implemented by a single system (such as by the front-end interface system implementing the message instruction system features described herein). In the illustrated embodiment, a message instruction rendering system 320 is illustrated as a part of the front-end interface system, but may be a separate system in other embodiments.

In the illustrated embodiment, the front-end interface system may generally be responsible for providing front end communication with various user devices, such as a user computing device 302, via network 308. The front-end communication may include generating text and/or graphics, which may be organized as a page or user interface using hypertext transfer or other protocols in response to requests received from the various user devices. User interface data or page data that is generated in response to user requests may be generated using a combination of various components and systems that are illustrated as part of the system 310 or in communication with the system 310, such as the interface rendering and composition components 312, interface data application programming interface ("API") 314, message instruction provider system 340, and message instruction rendering system 320, which will be described below.

The interface rendering and composition components 312 may generally be responsible for retrieving or receiving data from various sources to assemble into a user interface, page, audio presentation data or other content to be sent to a user device 302 for presentation. In addition to sources such as the message instruction provider system 340 (which may provide message instruction data to the interface rendering and composition components 312 via the API 314), it will be appreciated that the sources of page content accessed by the interface rendering and composition components 312 may include sources not illustrated in FIG. 3, depending on the embodiment. For example, in embodiments in which message instruction features described herein are utilized in a retail website environment, the interface rendering and composition components 312 may be in communication with one or more retail servers, an item catalog system (e.g., that provides information regarding items available for purchase), a data store that stores user data (such as user account information, payment information, etc.), and/or other retail-related systems and components known in the art. Retail-specific components are not illustrated in FIG. 3 in part because inventive aspects of the present disclosure are not limited to a retail environment or any other particular type of user-facing service, but rather provide benefits across many types of network-accessible services in which consistent and scalable presentation of messages or other information across different presentation contexts is desired.

In some embodiments, the message instruction provider system 340 may implement various business logic (such as embodied in code developed in consultation with a product manager or owner of a given website feature) in order to determine massaging content to present to a user in a given portion of a user interface to be generated by the interface rendering and composition components 312. This logic or code may be agnostic to any particular viewing environment (e.g., whether the user is viewing the user interface in a browser or a dedicated application, whether on a mobile phone or a desktop computer, etc.). Accordingly, a message instruction object returned by the message instruction provider system 340 (such as via the API 314) may be the same across different content types or presentation environments, which helps to maintain consistency in the user experience across different viewing environments. The illustrated arbitrator 342 (which may be optional in some embodiments) may be responsible for selecting a message (and associated message instruction object) to return in a given instance, which may include selecting an optimal or preferred message by applying matching rules based on input information associated with the user, the page to be generated, business logic, past user interactions, and/or other data. In other embodiments, a particular message may be explicitly requested by the interface rendering and composition components 312 (such as by being referenced by an identifier within code of an underlying page to be displayed). The orchestrator 344 may be responsible for managing the incoming requests (such as from the API 314) and for interfacing with message providers or other message sources, such as subsystems or components of the message instruction provider system 340 that manage message content for different development teams or website features (not illustrated in FIG. 3).

As will be described in more detail below, the message instruction rendering system 320 may generally be responsible for implementing view-related logic or functionality in order to render message instruction data according to an appropriate template for the given presentation environment or other context. The controller 322 of the system 320 may be generally orchestrate or manage data flow between incoming requests (such as from the interface rendering and composition components 312), the renderer 324, and the template provider 326. The renderer 324 may generate a view fragment to be output by the system 320 (such as for providing to the interface rendering and composition components 312), which may be based on context information, view model data (which may be from a message instruction object output by the system 340) and a template selected by the template provider 326 (and retrieved from template data store 330). The renderer 324, in some embodiments, may provide a data binding execution environment to view model data (from a message instruction object) into a template view. Furthermore, in some embodiments, the renderer may access an extensible library of code modules that can be used or referenced in templates as building blocks and which can encapsulate complex view logic. For example, such code modules could include popup dialog boxes, timers, date rendering, and/or many others.

User computing devices 302 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, smart speaker (with or without a display screen), kiosk, augmented reality device, other wireless device, set-top or other television box, and the like. User devices 302 may communicate with the system 310 via a communication network 308, such as the Internet or other communications link. The network 308 may be any wired network, wireless network or combination thereof. In addition, the network 308 may be a personal area network, local area network, wide area network, cable network, satellite network, cellular telephone network, etc. or combination thereof. For example, the network 308 may be a publicly accessible network of linked networks, possibly operated by various distinct parties, such as the Internet. In some embodiments, the network 308 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 308 may use protocols and components for communicating via the Internet or any of the other aforementioned types of networks.

While the only data store illustrated in FIG. 3 is a template data store 330, it will be appreciated that a number of other data stores may be utilized in some embodiments. For example, separate data stores may be used to store templates, message instruction data, user data, page data, and/or various other data described herein. In some embodiments, template data store 330 and/or other data stores accessed in the environment 300 may be local to any one of the illustrated systems, may be remote from all of the illustrated systems, and/or may be a network-based service itself. Data stores referenced herein may be embodied in hard disk drives, solid state memories, any other type of non-transitory computer-readable storage medium, and/or a file, a database, a relational database, in-memory cache, and/or stored in any such non-transitory computer readable medium. The data stores may also be distributed or partitioned across multiple local and/or storage devices, or combined into a single storage device, without departing from the spirit and scope of the present disclosure.

The environment 300 is depicted in FIG. 3 as operating in a distributed computing environment including several computer systems that are interconnected using one or more computer networks. The illustrated systems could also operate within a computing environment having a fewer or greater number of devices than are illustrated in FIG. 3. Thus, the depiction in FIG. 3 should be taken as illustrative and not limiting to the present disclosure. For example, the front-end interfaces system and/or message instruction provider system could implement various web services components and/or peer to peer network configurations to implement at least a portion of the processes described herein.

Figure 4:
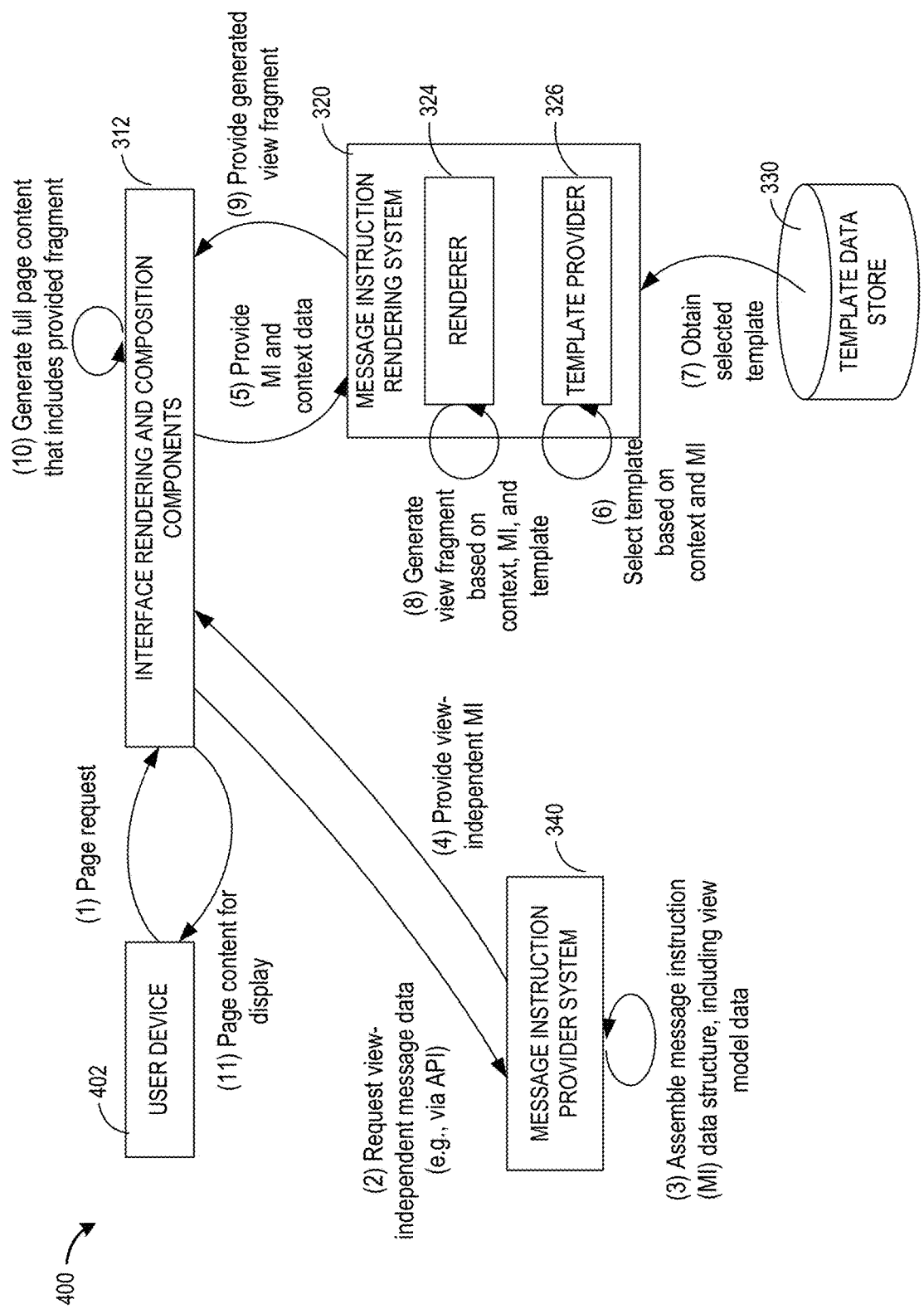
FIG. 4 depicts illustrative data flow and actions that may occur in the operating environment of FIG. 3 in order to respond to a user device's page request with generated page content for display, according to some embodiments.

FIG. 4 depicts illustrative data flow 400 that may occur in the operating environment of FIG. 3 in order to respond to a user device's page request with generated page content for display, according to some embodiments. While the illustrative process is described below with respect to generating a page, user interfaces other than a page may be generated in other embodiments. Furthermore, while generating and presenting a visual or graphical user interface will be used as an example below with respect to FIG. 4, it will be appreciated that the generated content may be generated for ultimate display to the user in a form other than a graphical user interface (such as for presentation as audible speech content output by a speaker, which the system 310 may initially generate as text and/or structured data for transformation into speech content). The illustrative process begins at step (1), where a user device 402 sends a page request to the interface rendering and composition components 312. This request may come indirectly, such as by the user device requesting a page from a retail server or other service that provides webpages or other user interface to user devices, and that system may in turn employ the interface rendering and composition components 312 to generate content in response to the user request.

The interface rendering and composition components 312 may initially obtain page data or other base content that indicates that at least a portion of the page should incorporate message content from the message instruction provider system (step not illustrated in FIG. 4). For example, code of an item detail page may indicate that a certain portion of the page (such as a display slot or row on the page) should be populated with delivery time estimate information from the message instruction provider system 340. At step (2), one of the interface rendering and composition components 312 may send a request for view-independent message data (such as delivery time information) to the message instruction provider system 340, such as via the API 314.

At step (3), the message instruction provider system 340 may assemble a message instruction data structure (or message instruction object) in response to the request received at step (2). The message instruction object may encapsulate view model data that will be used in rendering, but without including any view-specific logic or rendering instructions. For example, the message instruction data may be in the form of key-value pairs that provide the data needed to render a desired message or information, without indicating how that data should be formatted and rendered for display. As one specific example, a given key in a key-value pair may be labeled "deliveryDate," and its corresponding value indicated as "2020-10-11" (which may indicate Oct. 11, 2020). A template (discussed further below) may then reference this key ("deliveryDate") to indicate that the associated value should be inserted in a view fragment with certain display formatting, though that display information is not indicated in the message instruction object itself.

The message instruction object or data structure is then sent to the interface rendering and composition components 312 (such as via the API 314) at step (4), in response to the previous request. At step (5), the interface rendering and composition components 312 then passes this message instruction object, along with context information of the user interface request and/or the display environment, to the message instruction rendering system 320, such as in association with a request for the message rendering system 320 to return a rendered view fragment to the interface rendering and composition components 312. As discussed above, the context information may include various contextual attribute values corresponding to contextual attributes established in a given embodiment or use case. For example, contextual attribute values may be provided for contextual attributes such as page type, page variant type, the page slot in which the view fragment will appear, the client device type on which the page will be displayed, etc.

At step (6), the template provider 326 of the message instruction rendering system 320 selects an appropriate template to be used in rendering data of the message instruction object. The template may be selected by applying the received contextual attribute information to a template selection data structure stored in template data store 330 (or executable instructions that implement logic similar to such a data structure described herein). One such example with reference to a tree structure will be described with reference to FIG. 5 below. Once the correct template for the current display context is determined, that template is obtained from the template data store 330 at step (7). The renderer 324 then uses the template to generate a view fragment or portion of user interface data, such as by injecting view-independent data from the message instruction object into the template, as well as executing any associated code modules. View fragment generation is further discussed elsewhere herein.

At step (9), the message instruction rendering system 320 then provides the generated view fragment or portion of the user interface to the interface rendering and composition components 312. At step (10), the interface rendering and composition components 312 may generate the full page content, which may include incorporating the view fragment in one portion or slot of the page, and incorporating content from one or more other sources into other portions of the page. In some embodiments, other portions of the page may include messaging derived from other message instruction objects and corresponding templates. The page content may then be sent to the user device 402 for display at step (11).

Figure 5:
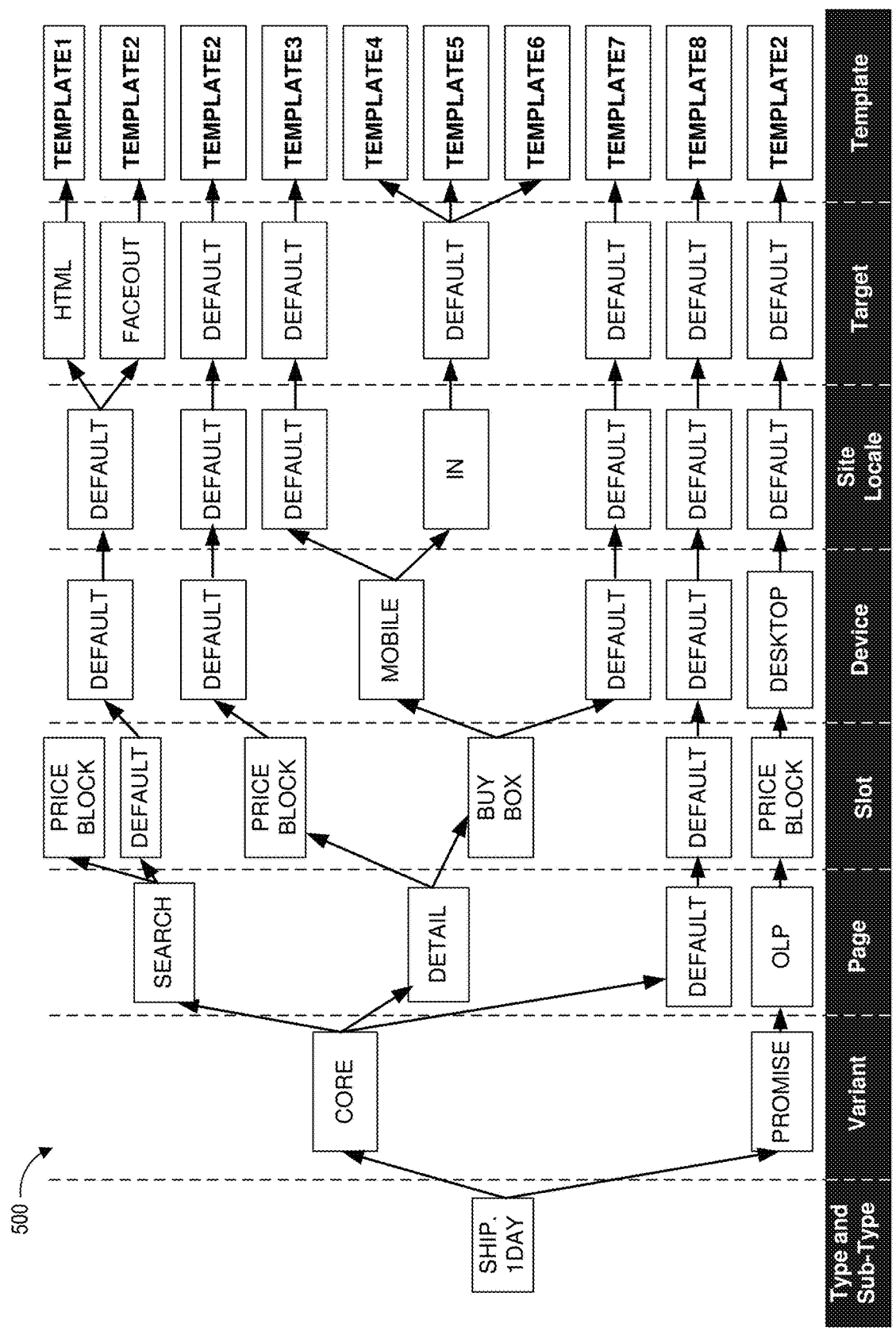
FIG. 5 is an illustrative graphical representation of a tree structure that may be traversed by a message instruction rendering system in order to select a template based on contextual attribute information, according to one embodiment.

FIG. 5 is an illustrative graphical representation of a tree structure 500 that may be traversed by the message instruction rendering system 320 in order to select a template based on contextual attribute information, according to one embodiment. While a tree structure is shown, it will be appreciated that a template selection data structure may instead be implemented as a graph or in some other form, in some embodiments. As shown in FIG. 5, the far left node may be considered the root node of the tree structure 500, which may be traversed based on the contextual attribute values at each level. The labels along the bottom of FIG. 5 indicate the contextual attribute type represented by each level of the tree (e.g., the contextual attribute type "Variant" is one layer or level of the tree, and the following layer or level is the contextual attribute type "Page"). Accordingly, based on a given set of contextual attributes for a given instance of user interface generation, the tree structure 500 may be traversed by the template provider 326 to follow the matching contextual attribute values at each level until a leaf node is reached. The leaf nodes in the illustrated tree structure 500 each identify a template to be used in the given context (e.g., the context defined by the path of contextual attribute values of the nodes traversed to reach the given leaf node). As shown, individual templates may be shared or reused in multiple contexts (such as the template identified as "TEMPLATE2" appearing as multiple leaf nodes).

In some embodiments, the file structure or directory structure of the template data store 330 in which the templates are stored may mirror or be similar to the levels of the template selection data structure (such as tree structure 500). For example, each layer or level of the tree structure 500 may be a different level of subdirectories in the file structure, where individual subdirectories have names matching the node labels shown in the tree structure 500, Accordingly, the templates (or shortcuts, aliases or pointers to templates) may be stored in a file path that includes a series of directories matching the path traversed in the tree structure to reach the given template leaf node. In some embodiments, the tree structure may be derived from the file directory, or vice versa, at the time of development. While no such nested directory structures may be employed in some embodiments, in other embodiments a nested file structure may be traversed (or a subdirectory containing a template may be directly accessed by its context-based file path) rather than using a tree data structure to identify a template to use in a given instance. Members of a development team for a given messaging feature may modify the associated template files, which may be done without modifying the template selection data structure that points to or references these template files by name, such that changes automatically propagate to different display environments. Such members may also modify a template selection data structure, such as to modify which contextual attribute combinations have leaf nodes pointing to particular template files, in addition to or separate from modifying the templates themselves. For example, the message instruction rendering system 320 may receive a request from an approved user to edit the template selection data structure with respect to at least one set of context information that currently points to a given template file, and in response to the request, may store a modified template selection data structure that indicates that a different template file be used to render content in association with subsequent requests to generate user interface data for the given context. Accordingly, subsequent page generation calls that include the same underlying message instruction data and are to be displayed in the same context may appear differently than before the change. The template files themselves may be in different forms depending on the embodiment, such as including text and/or HyperText Markup Language (HTML) tags.

Figure 6:
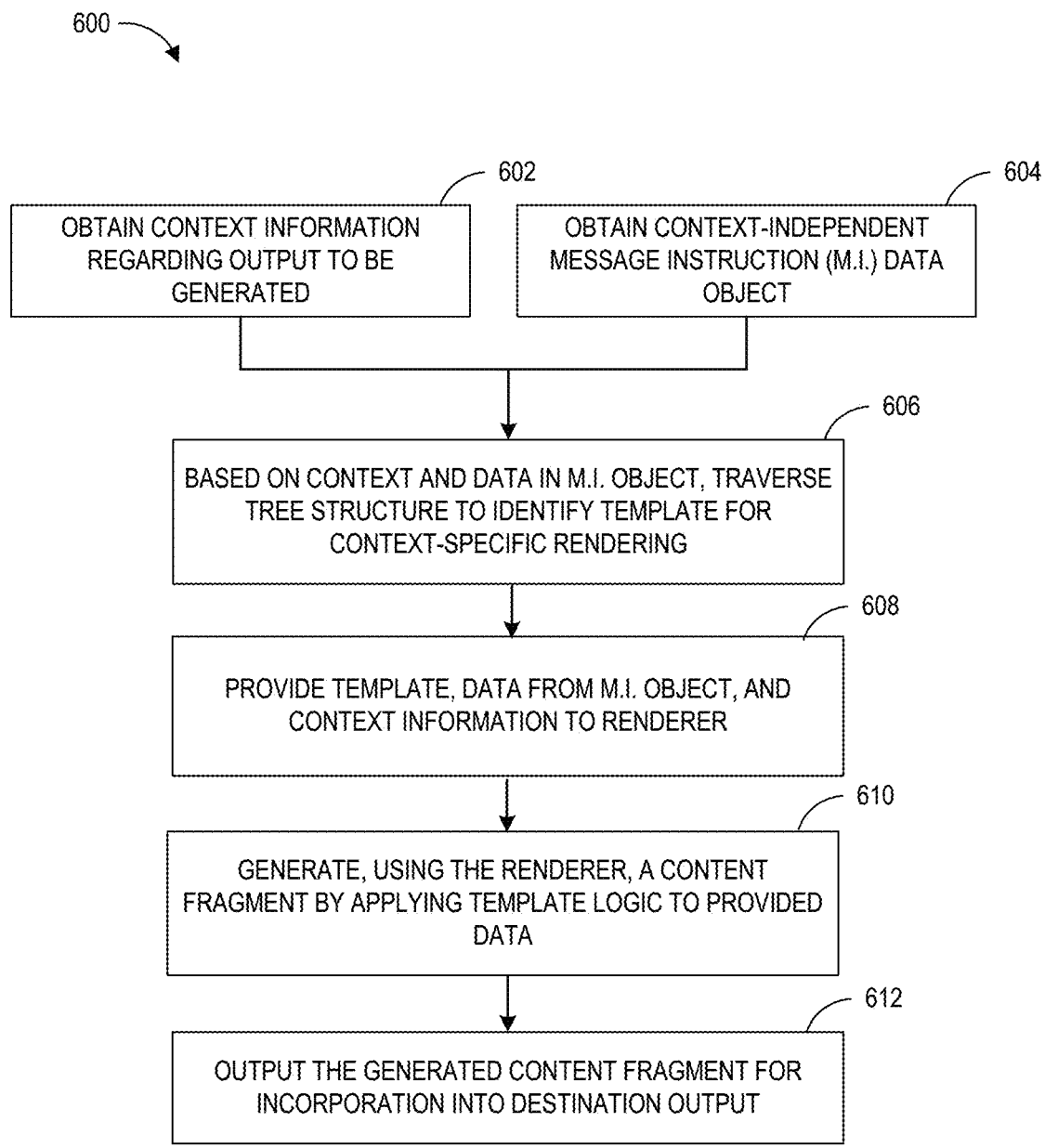
FIG. 6 is a flow diagram depicting an illustrative method for generating a view fragment or portion of a user interface based on message instruction data and context information.

FIG. 6 is a flow diagram depicting an illustrative method 600 for generating a view fragment or portion of a user interface, or at least a portion of content other than a user interface that is to be presented to a user, based on message instruction data and context information. The illustrative method 600 may be implemented by the message instruction rendering system 320, such as in response to a request from the interface rendering and composition components 312 to generate a view fragment or other content portion for inclusion in a portion of a page or user interface.

The illustrative method 600 begins at block 602, where the message instruction rendering system 320 (such as at the controller 322) may obtain context information regarding the user interface, content or other output to be generated (and/or regarding the presentation environment or endpoint for the visual and/or audible presentation), such as from the interface rendering and composition components 312. Before, after or in parallel with block 602, the message instruction rendering system 320 (such as at the controller 322) may obtain a context-independent message instruction object or other message instruction data associated with a given messaging feature (such as an item delivery messaging feature described above). The message instruction object may be received from the interface rendering and composition components 312, or directly from the message instruction provider system 340 in other embodiments. Obtaining the context information and message instruction object at blocks 602 and 604 has been described above in more detail, such as with reference to FIG. 4.

Next, at block 606, the template provider 326 may determine which template to use to render the view fragment (or to use in otherwise generating the portion of content, such as in cases other than visual user interfaces) for the given request. For example, the template provider 326 may, based on the contextual attributes and optionally on data in the message instruction object (such as use case information that indicates a feature type, page type or other data regarding the intended messaging), traverse a tree structure or other template selection data structure or logic to identify a template for context-specific rendering in the given context. Selection of a template has been described in more detail above, such as with reference to FIG. 5. The selected template, the view data or other metadata (such as key-value pairs) from the message instruction object, and context information may then be internally provided to the renderer 324 (such as by the controller 322) for use in rendering the view fragment, user interface data or other content at block 608.

At block 610, the renderer may generate the requested view fragment or other content fragment or portion by applying template logic and/or formatting specified in the template to the provided data from the message instruction object. In some embodiments, constraints may be placed on the templates such that a template may not reference any external data or content other than data from the provided message instruction object. For example, if the message instruction object relates to a delivery time estimate feature, the template may reference some or all of a number of data values in the message instruction object (such as by referencing the given value's key in a key-value pair) to include presentation of those values in the content fragment, but may not be permitted to incorporate data from other sources (such as outside modules that provide user data, weather information, shipping tracking, etc.). Such sandboxing limitations that may be enforced at the message generation at block 610 provide advantages that include enforcing messaging consistency across templates and presentation environments, providing a front-end independent execution environment, and preventing template authors from creating unnecessary coupling in the front-end with multiple data sources and outside code (which may otherwise entangle the implementation and make it difficult to modify and maintain in the long term). However, given templates may include more or less of the message instruction data in their associated content fragments relative to other templates. For example, a template that is intended to generate content for display on a mobile device having a small screen may indicate to display three data values from a given message instruction object, while another template intended to generate content for display on devices with larger screen sizes may indicate to display five data values from the same message instruction object.

In some embodiments, the message instruction rendering system may call one or more code modules referenced in the template when rendering the content fragment, such as code modules that encapsulate complex view logic that is stored outside of the template itself to avoid the logic being repeated across multiple templates. As mentioned above, the renderer may generate the content fragment by implementing a data binding execution environment, whereby content is rendered for inclusion in the view fragment by injecting, within the data binding execution environment, data from the message instruction object into content of the selected template. Once the renderer has rendered the content fragment or user interface data, the generated fragment or user interface data is output (such as being returned to the interface rendering and composition components 312) for incorporation into the destination user interface or other destination content, at block 612. The illustrative method 600 then ends.

Figure 7:
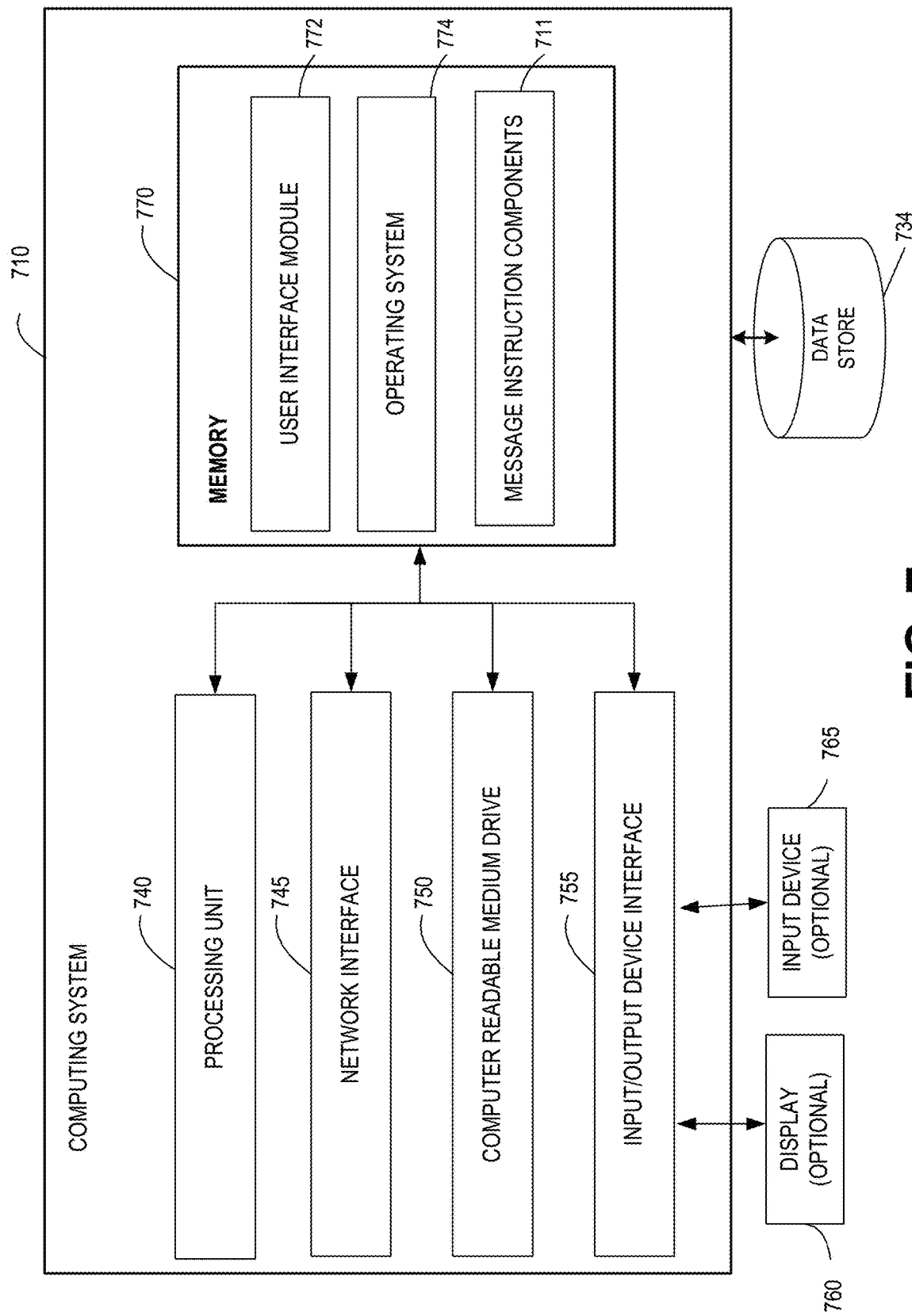
FIG. 7 is a block diagram depicting an illustrative architecture for a computing system that may implement one or more of the features described herein.

FIG. 7 depicts a general architecture of a computing system 710 that may be configured to implement various aspects of the present disclosure. The computing system architecture depicted in FIG. 7 may be used to implement one or more of the front-end interface system 310, message instruction provider system 340, and/or message instruction rendering system 320, in some embodiments. The general architecture of the computing system 710 depicted in FIG. 7 includes an arrangement of computer hardware and software components. The computing system 710 may include many more (or fewer) elements than those shown in FIG. 7. It is not necessary, however, that all of these generally conventional elements be shown in order to provide an enabling disclosure. As illustrated, the computing system 710 includes a processing unit 740, a network interface 745, a computer readable medium drive 750, an input/output device interface 755, a display 760, and an input device 765, all of which may communicate with one another by way of a communication bus. The network interface 745 may provide connectivity to one or more networks or computing systems. The processing unit 740 may thus receive information and instructions from other computing systems or services via a network, such as network 308. The processing unit 740 may also communicate to and from memory 770 and further provide output information for an optional display 760 via the input/output device interface 755. The input/output device interface 755 may also accept input from the optional input device 765, such as a keyboard, mouse, digital pen, microphone, touch screen, gesture recognition system, voice recognition system, accelerometer, gyroscope, or other input device.

The memory 770 may contain computer program instructions (grouped as modules or components in some embodiments) that the processing unit 740 executes in order to implement one or more embodiments. The memory 770 generally includes RAM, ROM and/or other persistent, auxiliary or non-transitory computer readable media. The memory 770 may store an operating system 774 that provides computer program instructions for use by the processing unit 740 in the general administration and operation of the computing system 710. The memory 770 may further include computer program instructions and other information for implementing aspects of the present disclosure. For example, in one embodiment, the memory 770 includes a user interface module 772 that generates user interfaces or portions of a user interface (and/or instructions therefor) for display upon a computing device, e.g., via a navigation interface such as a browser or application installed on the computing device. In addition, memory 770 may include or communicate with a data store 734 and/or one or more other data stores. For example, depending on the aspects of the present disclosure that the computing system 710 implements in a given embodiment, the data store 734 may store message instruction data, context information, templates, template selection data structures, page data, user data, and/or other data. Similarly, the features implemented by the one or more message instruction components 711 may depend on whether the computing system 710 is used to implement aspects of the disclosure described above with respect to the front-end interface system 310, message instruction provider system 340, and/or message instruction rendering system 320. For example, the component(s) 711 in a given embodiment may include one or more of the interface data API 314, interface rendering and composition components 312, controller 322, renderer 324, template provider 326, arbitrator 342, and/or orchestrator 344.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a non-transitory data store that stores (a) a plurality of templates for rendering user interface data and (b) a template selection data structure for use in selecting among the plurality of templates based at least in part on context; and
    at least one computing device configured with computer-executable instructions that, when executed, cause the at least one computing device to:
        receive a request to generate a user interface for display by a client computing device;
        identify that the user interface should include, within a first portion of the user interface, display of content related to a view-independent messaging feature;
        obtain a message instruction object associated with the view-independent messaging feature, wherein the message instruction object comprises a plurality of key-value pairs identifying view-independent data for use in rendering message content for display across any of a plurality of contexts;
        obtain context information associated with the request, wherein the context information comprises at least (a) a type of user interface to be generated, (b) a portion type of the first portion of the user interface to be generated, and (c) a device type of the client computing device;
        dynamically select, from among the plurality of templates, a first template for use in rendering content to include in the first portion of the user interface, wherein the first template is identified based at least in part on (a) the template selection data structure, (b) the context information associated with the request, and (c) the view-independent data in the message instruction object, the first template identifying one or more keys of the plurality of key-value pairs, wherein each of the plurality of templates identify:
            a particular display formatting for display of the view-independent data based at least in part on the message instruction object, and
            a particular display location for display of the view-independent data within the first portion of the user interface based at least in part on the context information;
        inject the view-independent data from the message instruction object into the first template to render a view fragment for inclusion in the first portion of the user interface, wherein the first template identifies a first display formatting and a first display location for display of the view-independent data within the first portion of the user interface based on the one or more keys referenced by the first template corresponding to one or more values of the plurality of key-value pairs, the one or more values identifying the view-independent data; and
        generate the user interface for display by the client computing device, wherein the user interface includes:
            the view fragment in the first display location within the first portion of the user interface, wherein the view-independent data is generated for display within the view fragment based at least in part on the first display formatting; and
            an additional view fragment in a second display location within a second portion of the user interface, the additional view fragment derived from an injection of additional view-independent data from an additional message instruction object into a second template.

2. The system of claim 1, wherein the template selection data structure for use in selecting among the plurality of templates comprises a tree structure, wherein individual levels in the tree structure are each defined with respect to different types of context information.

3. The system of claim 2, wherein, in order to identify the first template, the at least one computing device is further configured to traverse the tree structure based on the context information associated with the request, wherein a node in the tree structure followed at a first level in the tree structure is determined based on a first contextual attribute value in the context information, wherein the first contextual attribute value is of a first contextual attribute type that corresponds to the first level in the tree structure.

4. The system of claim 1, wherein the template selection data structure comprises a file structure, wherein the file structure includes a plurality of nested directories.

5. The system of claim 4, wherein the at least one computing device is further configured to traverse a plurality of subdirectories in the file structure based on the context information associated with the request in order to obtain the first template.

6. A computer-implemented method comprising:
receiving a request to generate a user interface to be presented by a client computing device;
identifying that the user interface should include, within a first portion of the user interface, display of content related to a context-independent messaging feature;
obtaining a message instruction object associated with the context-independent messaging feature, wherein the message instruction object comprises a plurality of key-value pairs identifying context-independent data for use in generating message content for presentation across any of a plurality of contexts;
obtaining context information associated with the request, wherein the context information comprises at least (a) a type of user interface to be generated, (b) a portion type of the first portion of the user interface to be generated, and (c) a device type of the client computing device;
accessing, from an electronic data store, a template selection data structure indicating which template, from among a plurality of templates, to use in generating content in each of a plurality of contexts;
dynamically selecting, from among the plurality of templates, a first template for use in generating at least the first portion of the user interface, wherein the first template is identified based at least in part on (a) the template selection data structure, (b) the context information associated with the request, and (c) the context-independent data in the message instruction object, the first template identifying one or more keys of the plurality of key-value pairs, wherein each of the plurality of templates identify:
 a particular display formatting for presentation of the content related to the context-independent messaging feature based at least in part on the message instruction object, and
 a particular display location of the client computing device for presentation of the content related to the context-independent messaging feature within the first portion of the user interface based at least in part on the context information; and
generating the user interface to be presented by the client computing device, wherein the first portion of the user interface is generated using at least the first template and at least a portion of the context-independent data from the message instruction object, wherein the first template identifies a first display formatting and a first display location of the client computing device for presentation of the content related to the context-independent messaging feature within the first portion of the user interface based on the one or more keys referenced by the first template corresponding to one or more values of the plurality of key-value pairs, the one or more values identifying the context-independent data, wherein the content related to the context-independent messaging feature is generated for display within the first portion of the user interface by the client computing device in the first display location of the client computing device based at least in part on the first display formatting, wherein an additional portion of the user interface is generated for display by the client computing device in a second display location of the client computing device based on additional one or more keys referenced by an additional template corresponding to additional context-independent data.

7. The computer-implemented method of claim 6, wherein the first template references the one or more keys to indicate that an associated value from the message instruction object should be included for presentation of the content related to the context-independent messaging feature.

8. The computer-implemented method of claim 6, wherein the user interface is presented audibly by the client computing device.

9. The computer-implemented method of claim 6, wherein the user interface comprises a graphical user interface that is visually presented by the client computing device.

10. The computer-implemented method of claim 6, wherein the first template references at least a portion of the context-independent data from the message instruction object and does not reference any other data external to the template.

11. The computer-implemented method of claim 10, wherein the first template is associated with a contextual attribute representing a mobile phone, wherein a second template is associated with a contextual attribute representing a desktop computing device, wherein the first template references less data from the message instruction object than the second template references from the message instruction object, such that the first portion of the user interface generated using the first template includes less content than a second portion of the user interface that is generated using the second template.

12. The computer-implemented method of claim 6, wherein the template selection data structure comprises a tree structure, wherein individual levels in the tree structure are each defined with respect to different types of context information.

13. The computer-implemented method of claim 12, wherein dynamically selecting the first template for use in generating at least the first portion of the user interface comprises:
traversing the tree structure based on the context information associated with the request, wherein a node in the tree structure followed at a first level in the tree structure is determined based on a first contextual attribute value in the context information, wherein the first contextual attribute value is of a first contextual attribute type that corresponds to the first level in the tree structure.

14. The computer-implemented method of claim 6 further comprising:
receiving a request from an approved user to edit the template selection data structure with respect to at least one set of context information; and
in response to the request, storing a modified template selection data structure that indicates that a template other than the first template be used to generate the user interfaces in association with subsequent requests to generate the user interface based on the message instruction object.

15. A system comprising:
a non-transitory data store that stores (a) a plurality of templates for generating content for presentation and (b) a template selection data structure for use in selecting among the plurality of templates based at least in part on context; and
at least one computing device configured with computer-executable instructions that, when executed, cause the at least one computing device to:
 receive a request to generate a user interface to be presented by a client computing device;

identify that the user interface should include, within a first portion of the user interface, display of content related to a context-independent messaging feature;

obtain a message instruction object associated with the context-independent messaging feature, wherein the message instruction object comprises a plurality of key-value pairs identifying context-independent data for use in generating message content for presentation across any of a plurality of contexts;

obtain context information associated with content to be presented and the request, wherein the context information comprises at least (a) a type of user interface to be generated, (b) a portion type of the first portion of the user interface to be generated, and (c) a device type of the client computing device;

dynamically select, from among the plurality of templates, a first template for use in generating at least the first portion of the user interface, wherein the first template is identified based at least in part on (a) the template selection data structure, (b) the context information associated with the content to be presented and the request, and (c) the context-independent data in the message instruction object, the first template identifying one or more keys of the plurality of key-value pairs, wherein each of the plurality of templates identify:

a particular display formatting for presentation of the content related to the context-independent messaging feature based at least in part on the message instruction object, and a particular display location for presentation of the content related to the context-independent messaging feature within the first portion of the user interface based at least in part on the context information; and generate the content to be presented, wherein the first portion of the user interface is generated using at least the first template and at least a portion of the context-independent data from the message instruction object, wherein the first template identifies a first display formatting and a first display location for presentation of the content related to the context-independent messaging feature within the first portion of the user interface based on the one or more keys referenced by the first template corresponding to one or more values of the plurality of key-value pairs, the one or more values identifying the context-independent data, wherein the content related to the context-independent messaging feature is generated for display within the first portion of the user interface in the first display location based at least in part on the first display formatting, wherein an additional portion of the user interface is generated for display in a second display location based on additional one or more keys referenced by an additional template corresponding to additional context-independent data.

16. The system of claim 15, wherein the at least one computing device is further configured to implement a data binding execution environment, wherein the first portion of the user interface is generated by injecting, within the data binding execution environment, at least a portion of the context-independent data from the message instruction object into the first template.

17. The system of claim 15, wherein the message instruction object is selected from among a plurality of message instruction objects by an arbitration component that applies predefined rules to dynamically select a message instruction object to obtain for generating an individual instance of the user interface.

18. The system of claim 15, wherein the template selection data structure is one of a tree structure or a graph structure.

19. The system of claim 18, wherein a plurality of individual nodes in the template selection data structure each identify a different contextual attribute value, and wherein leaf nodes in the template selection data structure each identify a template.

* * * * *